United States Patent [19]

Klee

[11] Patent Number: 4,480,154

[45] Date of Patent: Oct. 30, 1984

[54] AUTOMATIC TELEPHONE SILENCER

[76] Inventor: Maurice M. Klee, 262 Euclid Ave., Fairfield, Conn. 06430

[21] Appl. No.: 495,088

[22] Filed: May 16, 1983

Related U.S. Application Data

[63] Continuation-in-part of Ser. No. 216,660, Dec. 15, 1980, Pat. No. 4,384,171.

[51] Int. Cl.³ .................... H04M 1/21; H04M 11/02
[52] U.S. Cl. ............................ 179/84 C; 179/2 TC; 368/13
[58] Field of Search ............. 179/2 TC, 84 C; 368/4, 368/13

[56] References Cited

U.S. PATENT DOCUMENTS

| | | | |
|---|---|---|---|
| 2,481,840 | 9/1949 | Hardgrave | 179/84 C |
| 3,867,584 | 2/1975 | Rengren | 179/84 C |
| 4,405,839 | 9/1983 | Groff | 179/84 C |

OTHER PUBLICATIONS

FCC Registration No. BK685T-67788-OT-E, granted 3/28/1979, to the Burket Co., Toledo, Ohio.

*Primary Examiner*—Keith E. George

[57] ABSTRACT

Apparatus is provided for automatically silencing a telephone ringer. In accordance with one aspect, the apparatus places the telephone's ringer under the control of a 24-hour timer so that once the timer is set, the ringer will automatically be silenced for one or more prescribed periods of time on a daily basis. In accordance with another aspect, the apparatus automatically silences the telephone's ringer in conjunction with the setting and shutting off of an alarm clock. In accordance with a further aspect, the apparatus silences the telephone's ringer in conjunction with both the operation of a 24-hour timer and the setting and shutting off of an alarm clock.

14 Claims, 5 Drawing Figures

AUTOMATIC TELEPHONE SILENCER

CROSS-REFERENCE TO RELATED APPLICATIONS

This application is a continuation-in-part of copending application Ser. No. 216,660, filed Dec. 15, 1980 now U.S. Pat. No. 4,384,171.

BACKGROUND OF THE INVENTION

1. Field of the Invention

This invention relates to apparatus for automatically silencing a telephone ringer. In accordance with one of its aspects, the invention relates to apparatus for placing a telephone's ringer under the control of a 24-hour timer so that once the timer is set, the ringer will be automatically silenced for one or more prescribed periods of time on a daily basis. In accordance with another of its aspects, the invention relates to apparatus for automatically silencing a telephone ringer in conjunction with the setting and shutting off of an alarm clock. In accordance with a further aspect, the invention relates to apparatus for silencing a telephone's ringer in conjunction with both a 24-hour timer and the operation of an alarm clock.

2. Description of the Prior Art

People have been annoyed at certain times of the day by the ringing of a telephone ever since telephones came into their homes and offices. Some people have used home remedies to avoid this disturbance and prevent the telephone from ringing. For example, they have placed the telephone where they could not hear it, they have left the receiver off the hook and they have set the ringer at its lowest possible volume. The telephone company has even provided an option whereby the telephone installer can set the lowest ringer volume to be essentially inaudible and thus off.

A major drawback with each of these remedies is that it is always necessary for the user to remember to employ the remedy and silence the telephone and then remember to reactivate it. None of these methods perform either the on or off function automatically on their own. As a result, people either forget to turn the ringer off and thus receive calls at annoying times or forget to turn the ringer back on and thus miss calls they are willing to receive.

Over the years a number of patents have issued, including U.S. Pat. Nos. 2,481,840, 3,867,584 and 3,982,072, relating specifically to the problem of silencing telephone ringers. None of these patents, however, have provided a practical way of automatically turning the ringer on and off at preselected times on a daily basis. Nor has the apparatus described in these patents provided a way to silence a telephone's ringer in conjunction with the setting and shutting off of an alarm clock. Moreover, the apparatus described in these patents would require physical wiring into the telephone system which would be difficult for the average user to do, or would lead, typically, to "howling" from the telephone. In addition, much of this apparatus is unduly complicated and would be prohibitively expensive to manufacture and market to consumers on a broad scale.

In recent years some commercial devices have been marketed directed to silencing telephone ringers. In particular, Saxton Products of Congers, N.Y. and Zoom Telephonics, Inc. of Boston, Mass. have offered add-on switches to turn the ringer off. Such switches are no better than the telephone company's option of having the lowest ringer volume be inaudible. Moreover, the instructions which accompany these switches describe taking apart some portion of the telephone system with tools and rewiring so that the apparatus will operate, and thus are difficult for the average person to use.

SUMMARY OF THE INVENTION

This invention overcomes the inherent problems of the prior art. In accordance with one aspect of the invention, apparatus is provided for silencing a telephone ringer automatically on a daily basis for those periods of time when the user does not want the telephone to ring. The apparatus places the ringer under the control of a 24-hour timer. Once the user chooses the time period or periods he wants the ringer silenced and sets the timer accordingly, the apparatus automatically silences the telephone for those periods on a daily basis without any further attention by the user.

More particularly, in accordance with this aspect, the invention provides electrically operated apparatus for automatically silencing a telephone ringer in a modular jack telephone system. Inserted in the conductive path to the telephone ringer is a means, electrically isolated from the silencer's source of electrical current, for interrupting the conductive path to the ringer, having a closed state in which the ringer can receive sufficient ringing current to ring and an open state in which the ringer cannot receive sufficient current to ring and is silenced. Connected to the silencer's source of electrical current and associated with the ringing path interrupting means, is a means for transferring the interrupting means between its open and closed states while maintaining the interrupting means electrically isolated from the silencer's source of electrical current.

In accordance with another aspect, the invention provides apparatus for automatically silencing a telephone ringer in conjunction with the operation of an alarm clock. The apparatus places the ringer under the control of the alarm clock's setting mechanism. When the user sets his alarm clock, e.g., at the time he goes to sleep, the apparatus automatically silences the telephone from that time until the time the alarm is turned off, e.g., shortly after the user is wakened by the alarm. In this way, without any special attention, the user is assured that the telephone will not ring while he is sleeping.

More particularly, in connection with this aspect, the invention provides apparatus for automatically silencing a telephone ringer in a modular jack telephone system comprising an electrically operated alarm clock including means for connecting the alarm clock to a source of electrical current and means for setting the alarm clock, said setting means having a first state in which the alarm is off and a second state in which the alarm is set to operate at a preselected time; modular connecting means compatible with a modular jack telephone system; a conductive path electrically connected to said modular connecting means for carrying ringing current to a telephone ringer; means for interrupting said conductive path, electrically isolated from said source of electrical current, having a closed state in which said ringer can receive sufficient ringing current to ring and an open state in which said ringer cannot receive sufficient current to ring and is silenced; and means associated with said setting means and said interrupting means for transferring said interrupting means between said open and closed states while maintaining said interrupting means electrically isolated from said source of electrical current, said means for transferring being responsive to the state of said setting means so that when said setting means is in its first state, said interrupting means is in its closed state, and when said setting means is in its second state, said interrupting means is in its open state.

In accordance with a further aspect of the invention, apparatus is provided which silences a telephone's ringer in conjunction with both the setting and shutting off of an alarm clock and the operation of a 24-hour timer. In accordance with certain preferred embodiments of this aspect of the invention, the control of the ringer by the setting and shutting off of the alarm clock takes precedence over the control due to the operation of the 24-hour timer.

In accordance with each aspect of the invention, the apparatus employs modular connection to the telephone system so that installation by the consumer is easy and requires no tools. Furthermore, the apparatus provides electrical isolation between its driving current and the telephone system so that it can be safely connected to that system. Also, when not silencing the ringer, the apparatus does not interfere with the normal operation of the consumer's telephone. In addition, the apparatus employs a limited number of components for low cost.

BRIEF DESCRIPTION OF THE DRAWINGS

FIGS. 1 and 2 show two specific embodiments of the present invention wherein the telephone's ringer is placed under the control of a 24-hour timer.

Corresponding numbers are used in the several figures to identify corresponding elements and components. The circuits of FIGS. 3 and 4 are used with the modular connectors and power cord of FIGS. 1 and 2.

As discussed fully below, alternate systems can be used in place of the systems shown in FIGS. 1-5 and the various systems can be mixed and matched to produce the totality of configurations of the silencer contemplated by this invention. Equivalent components can replace the devices shown and discussed.

DESCRIPTION OF THE PREFERRED EMBODIMENTS

Figure 1:
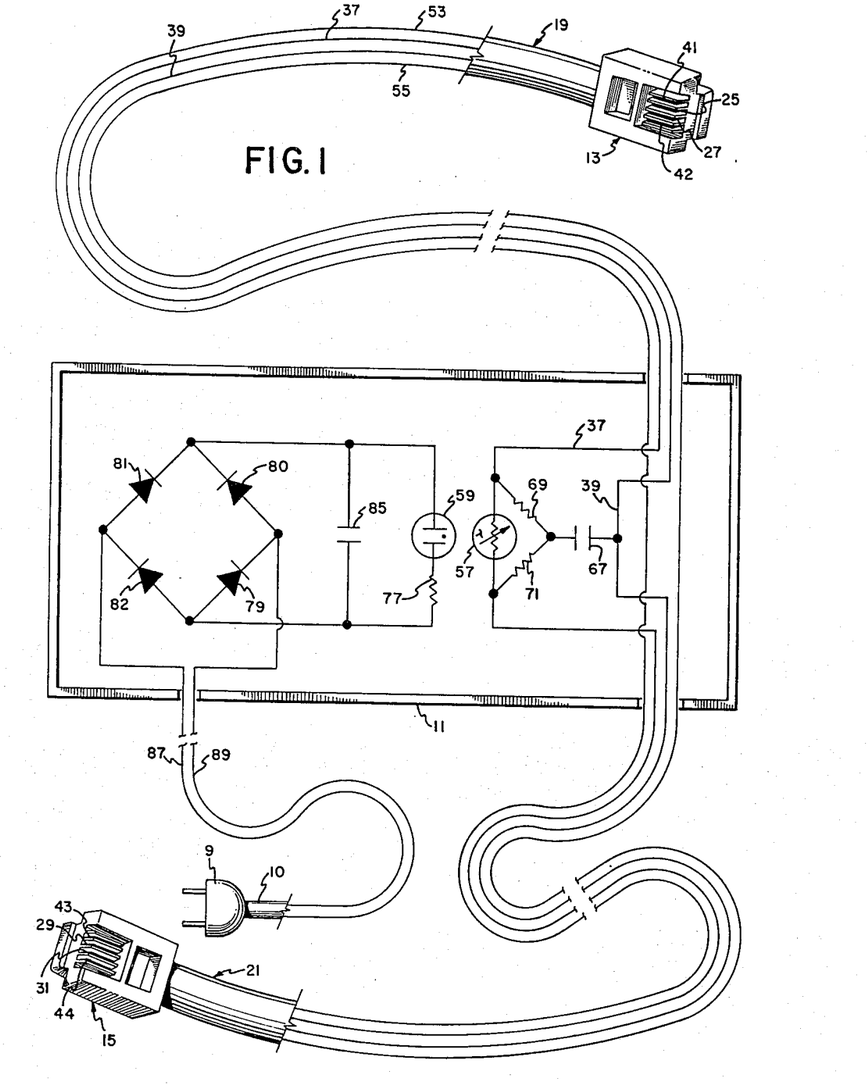
FIG. 1 shows a silencer using a photoresistor to interrupt the current to the telephone ringer, a neon bulb-bridge rectifier-filter capacitor network for transferring the photoresistor between its open and closed states and male modular connectors for connecting the silencer to the telephone network.
Figure 2:
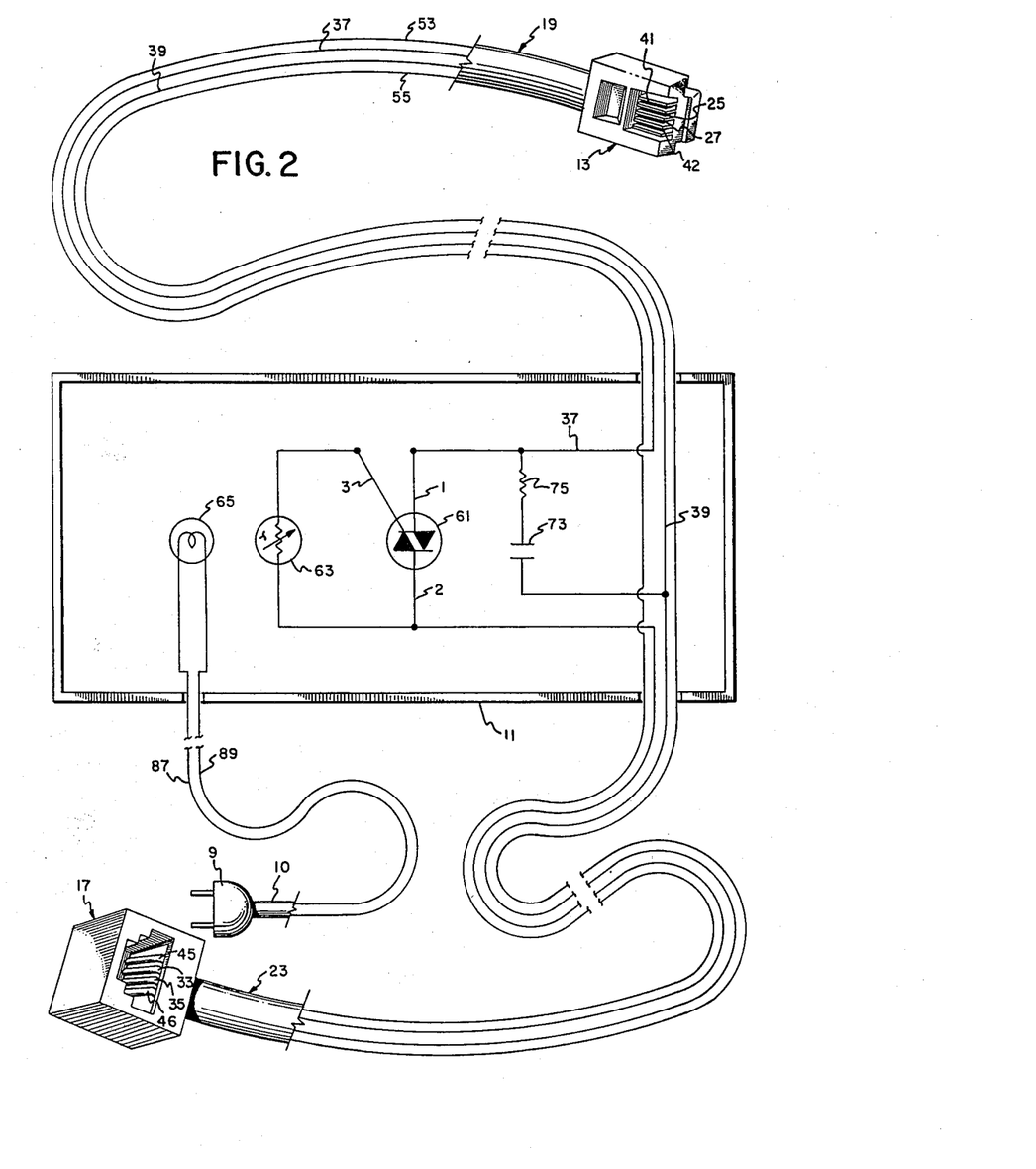
FIG. 2 shows an embodiment using a triac gated by a photoresistor to interrupt the current to the telephone ringer, an incandescent bulb for transferring the photoresistor-triac combination between its open and closed states and male and female modular connectors for connecting the silencer to the telephone network.

FIGS. 1 and 2 show two configurations of the automatic telephone silencer. Each configuration includes a male plug 9 at the end of cord 10 to supply driving current to the silencer, an enclosure 11 for components, and modular connectors to connect the silencer to the telephone system. For each configuration, at least one of the modular connectors is a male modular connector 13 for connection to a female modular wall jack or a female modular connector derived from a wall jack as for example through an extension cord, coupler or other device. The remaining modular connector is a male connector 15 in FIG. 1 and a female connector 17 in FIG. 2. This difference determines the types of telephones to which the silencer can be connected and the way the connection is made.

The FIG. 1 configuration can be used with telephone receivers such as the Western Electric model 500 desk telephone, having a detachable telephone cord connected to the telephone through a telephone mounted female modular connector. The silencer with its two male modular connectors 13 and 15 at the ends of two sections of telephone cord 19 and 21 serves as a replacement cord for the telephone's existing cord. Installation is accomplished by simply disconnecting the existing cord, replacing it with the silencer and plugging the silencer into a 24-hour timer.

The FIG. 2 configuration can be used both with telephone receivers having a detachable cord and with those having a fixed cord, permanently wired into the telephone, having a male modular connector at the far end of that cord. Male and female modular connectors 13 and 17 are carried at the ends of telephone cord sections 19 and 23. Installation is accomplished by unplugging the existing telephone cord from whatever female modular connecting it is attached to, plugging the silencer into that female modular connector through male modular connector 13, plugging the telephone cord into the silencer's female modular connector 17 and plugging the silencer into a 24-hour timer.

Although modular connectors 13, 15 and 17 as well as plug 9 are shown in FIGS. 1 and 2 attached to cords 19, 21, 23 and 10, it is to be understood that the cords can be eliminated and any or all of these components can be incorporated into component enclosure 11. Also, additional connectors can be incorporated into the system. For example, the component housing can be equipped with two female modular connectors, to one of which is attached a section of telephone cord having a male modular connector at each end. The final configuration in this case is equivalent to that of FIG. 2.

The modular connectors 13, 15 and 17 shown in FIGS. 1 and 2 are of the miniature six position, four contact type. In most cases, the silencer will be equipped with these connectors although other connectors, as well as adapters from one type of connector to another, can be used.

For a non-party line telephone station, the FIGS. 1 and 2 connectors carry ringing and voice currents which originate across the ring and tip conductors of the telephone network, on their middle two contacts, designated 25 and 27, 29 and 31, and 33 and 35, respectively for connectors 13, 15 and 17. In FIG. 1, contacts 25 and 29 are connected to conductor 37 and contacts 27 and 31 are connected to conductor 39. In FIG. 2, contacts 25 and 33 are connected to conductor 37 and contacts 27 and 35 are connected to conductor 39. The remaining contacts, 41 through 46, connected to conductors 53 and 55, are normally reserved for telephone company use.

In addition to its connection to the telephone system, the silencer is connected to a 24-hour timer. Various 24-hour timers can be used. Such timers generally have a time-of-day indicator, a toggle or latch for establishing an on-time and a toggle or latch for establishing an off-time. The timer provides current beginning at the on-time established by the on-time toggle and ending with the off-time established by the off-time toggle. Some timers have additional toggles to provide multiple on and off periods. When used with the silencer, these timers permit silencing the telephone for more than one period of time during the day. The silencing apparatus, rather than being external to the timer, can be incorporated into its housing, and, if convenient, both can be placed within the telephone's housing.

Electrically, the silencer has two states: a closed state in which the telephone ringer can receive sufficient current to ring and an open state in which the conductive path between the telephone network and the telephone ringer is interrupted so that the ringer cannot receive sufficient current to ring and is silenced. Which state the silencer is in and transfer between the states is under the control of the silencer's electrical driving current.

Because of the potential for damage to the telephone system and injury to personnel, each state and transfer between the states must provide for and maintain electrical isolation between the silencer's driving current and the telephone network. This isolation can be achieved through the use of a non-electrical coupling, such as a coupling based on optical, thermal, acoustic or magnetic energy.

The circuits of FIGS. 1 and 2 illustrate the use of optical coupling between a photoresponding system inserted in the conductive path to the telephone ringer and illumination generated by the driving current. In FIG. 1 a photoresistor 57 is inserted in conductor 37 and illumination comes from a neon bulb 59 connected to the driving current through a bridge rectifier-filter capacitor network. The photoresistor presents a low resistance to ringing and voice currents when illuminated and a high resistance when not illuminated. In FIG. 2, the responding system uses a triac 61 gated by a photoresistor 63 and illumination comes from an incandescent bulb 65. The triac presents low resistance when gated and high resistance when not gated. The photoresistor permits gating when illuminated and prevents it when not illuminated. Although the photoresistor-neon bulb and the triac-photoresistor-incandescent bulb systems are shown in FIGS. 1 and 2 for the male-male and male-female external configurations respectively, it is to be understood that the systems can be interchanged. Also, either light source can be used with either photoresponding system.

In each circuit, the light source and the photoresponding system are housed in component enclosure 11. This enclosure is made of opaque, insulating, heat resistant material so as to screen the photoresponding system from ambient light, insulate the components and the driving current from the user, and absorb without deterioration the heat generated by the light source and the passage of ringing and voice currents through the device.

The photoresponding system is inserted in conductor 37 in both FIGS. 1 and 2. For connector 13 attached to the telephone network, this conductor usually corresponds to the telephone network's normally negative ring conductor. Because the photoresponding systems are polarity insensitive, they can equally as well be placed in the tip conductor.

Bridged between conductors 37 and 39, in FIG. 1, is a Y network consisting of capacitor 67 and resistors 69 and 71. When the photoresponding system is in its open state, so that the shunt path for ringing current between conductors 37 and 39 provided by the telephone ringer cannot be reached, the bridge provides a substitute shunt path having a finite AC impedance and a large DC resistance. The Y configuration with a resistor in each arm of the Y is used so as to provide the substitute path for either orientation of the silencer, that is, with either modular connector facing the telephone network, while using only one capacitor. Typically, capacitor 67 will have a value of approximately 0.47 microfarads at a working voltage of 250 volts and will have a DC resistance greater than 10 megaohms while resistors 69 and 71 will each have a value of approximately 39 kilohms at ¼ watt. For a photoresponding system having a resistance of 60 kilohms (see discussion below) and for a 20 cycle per second applied ringing voltage, the equivalent impedance of the shunt will be approximately 33 kilohms. As an alternative to the Y network, two bridges, each consisting of a resistor and capacitor in series can be used, one on each side of the photoresponding system. Since the configuration of FIG. 2 is normally employed in only one direction, that is with connector 13 attached to the telephone network, only a single sided shunt on the network side consisting of capacitor 73 and resistor 75 is used. Typical values for these components are 0.47 microfarads and 27 kilohms respectively. The shunt networks can be eliminated for installations where an additional telephone or other apparatus, which is not silenced, is bridged across the telephone line.

Two light sources for activating the photoresponding system are shown in FIGS. 1 and 2. FIG. 1 uses a neon bulb 59 connected through a current limiting resistor 77 to a bridge rectifier-filter capacitor network which is connected to plug 9 through leads 87 and 89. FIG. 2 uses a miniature low wattage incandescent bulb 65 connected directly to the plug leads. Both sources provide steady light output which is sufficient when the source is placed close to the responding system to transfer that system into its closed state. Both sources also have a substantial operating life: the neon bulb being an inherently long-life device and the incandescent bulb either being chosen to intrinsically have long life or being operated at below rated voltage through the use of a voltage dropping resistor to achieve long life. Either light source can be used with either photoresponding system.

The full wave bridge rectifier-filter capacitor network of FIG. 1 is composed of diodes 79 through 82, which each have a peak inverse voltage rating greater than the peak AC applied voltage ($V_p$), and capacitor 85 which has a working DC voltage greater than $V_p$. The network converts AC driving current into a steady DC voltage ($V_{DC}$) plus a small AC ripple ($V_r$). The values of these voltages are given approximately by:

$$V_{DC} = V_p - V_r/2 \quad (1)$$

and $$V_r = \frac{2(V_p - V_N)}{4CfR + 1} \quad (2)$$

where $V_r$ is the peak-to-peak value of the ripple voltage, $V_N$ is the voltage drop across the neon bulb, C is the capacitance of filter capacitor 85 in farads, f is the frequency of the driving current in cycles/second and R is the resistance in ohms of current limiting resistor 77. Equation (1) follows from the definition of $V_r$.

Equation (2) is derived as follows. The neon bulb, once started, can be approximated by a pure voltage drop with negligible resistance compared to the resistance of the current limiting resistor. Accordingly, the magnitude of the steady DC current (I) flowing through the series combination of the resistor and the bulb is approximately the magnitude of the steady DC voltage ($V_{DC}$) across the series combination minus the voltage drop across the neon bulb ($V_N$), divided by the magnitude of the current limiting resistor (R):

$$I = \frac{(V_p - V_r/2) - V_N}{R} \quad (3)$$

For a full wave bridge rectifier-filter capacitor combination, the peak-to-peak ripple voltage is given approximately by:

$$V_r = \frac{I}{2Cf} \quad (4)$$

Substituting equation (3) into equation (4) and rearranging then gives equation (2).

Typical values for C, R and $V_N$ are 21 microfarads, 39 kilohms and 70 volts, respectively. $V_p$ for 120 volt rms current is 170 volts. Substituting in equations (1), (2) and (3) and using 60 cycles/second for f then gives a steady DC voltage of 169.5 volts, a peak-to-peak ripple voltage of 1 volt and a current flow of 2.6 milliamps.

Under these conditions resistor 77 dissipates 0.26 watts so that a ½ watt resistor is used. Diodes 79 through 82 supply this steady current and, in addition, carry the initial current to charge capacitor 85. Commonly available one ampere diodes having a surge current rating of 30 amperes for 16 milliseconds have been found adequate.

The combination of either light source with either photoresponding system of FIGS. 1 and 2 provides during illumination a steady low resistance to the flow of loop and ringing current so as not to interfere with the functioning of the telephone. When not illuminated, the responding system has high enough resistance to block incoming ringing current and thus silence the telephone.

For the circuit of FIG. 1, low closed state resistance is achieved through the use of a high conductance photoresistor and a small spacing between the photoresistor and the neon bulb. The open state resistance in the dark will depend on the particular photoresistor employed, but in general will be greater than 60 kilohms. Telephone ringers generally do not ring at applied voltages below approximately 40 volts rms. The typical ringing voltage, which the photoresistor must reduce, is 86 volts rms.

Although the specific electrical characteristics of telephone ringers vary between manufacturers and telephone types, and depend on the level of applied voltage, typical values include a total impedance on the order of 12 kilohms composed of a resistance on the order of 6 kilohms and a reactance, at ringing frequencies, on the order of 10 kilohms. The circuit composed of the silencer of FIG. 1 in series with such a ringer can be solved using complex variable techniques, the delta to wye transformation to handle the triangle composed of photoresistor 57 and shunt resistors 69 and 71 and, most conveniently, Thevenin's Theorem. For an 86 volt rms, 20 cycle/second applied ringing voltage, a 60 kilohm photoresistor and the values for the shunt components described above, the voltage drop across the ringer will be approximately 20 volts rms, well below the 40 volt level, and the ringer will be silenced.

The maximum recurrent voltage stress on the photoresistor will occur during this blocking of ringing voltage. For the circuit values described above, the peak of this voltage will be approximately 100 volts. Accordingly, a photoresistor rated above this level is used. The maximum heat generation in the photoresistor will occur during its conductive state when the telephone goes off-hook. The magnitude of the current flow in this state, depending on the particular local telephone loop, can range up to approximately 100 milliamps. Accordingly, a photoresistor having an illuminated resistance and a power rating capable of handling at least this level of current is used.

The triac of FIG. 2, when gated (triggered), presents a low resistance between its main terminals 1 and 2 to the flow of loop and ringing current. Its behavior in this state is similar to that of a forward biased diode. Gating for the triac is under the control of photoresistor 63. When the photoresistor is illuminated, it permits gating current to flow through gate lead 3 and out main terminal 1. This corresponds to quadrant I triggering for terminal 2 positive with respect to terminal 1 and quadrant III triggering when it is negative.

The triggering current itself comes from the initial portion of each half-cycle of ringing current or from the initial portion of the loop current which flows when the contacts within the telephone are closed as when the telephone goes off-hook or during pulse dialing. For small signal triacs, e.g. those rated to carry a few hundred milliamps at 25° C., the required gate triggering currents and voltages are typically on the order of a few milliamps and volts, respectively. For the contacts within the telephone closed and for a reasonable low illuminated photoresistor resistance, these levels are easily achieved since the loop battery voltage applied by the telephone network is typically greater than 40 volts, and the loop current is normally greater than 20 milliamps. The maximum trigger currents will also occur for the telephone contacts closed and, depending on the local loop, can be as high as approximately 100 milliamps. Even small signal triacs can typically withstand this level of triggering current.

During ringing, triggering will occur in most cases. However, because ringing can in some cases involve relatively low current flows, the required triggering levels for some triacs may not be achieved. Normal ringing nevertheless will occur even in these cases by means of the conductive path consisting of photoresistor 63, gate lead 3 and main terminal 1, provided the photoresistor has an illuminated resistance which is low compared to the impedance of the telephone ringer and the gate junction is sized to carry a sustained sub-triggering current flow.

Once triggering occurs, the potential at gate lead 3 becomes essentially equal to the potential at main terminal 2 so that, in effect, photoresistor 63 is eliminated from the circuit. Accordingly, the photoresistor need only be sized to carry pre-triggering current flows. This permits the use of low power photoresistors which in general are less expensive.

The elimination of the photoresistor upon triggering also means that the photoresistor does not have to have a constant resistance, provided its resistance stays below a value which will permit triggering or ringing, when the flow of ringing current does not lead to triggering. This permits the elimination of the bridge rectifier-filter capacitor network from the illumination portion of the circuit of FIG. 1, when neon bulb illumination is used with the triac-photoresistor combination of FIG. 2, leaving neon bulb 59 and current limiting resistor 77 connected directly to leads 87 and 89. The light output of the neon bulb for this circuit arrangement will be a series of pulses at twice the line frequency, as first one bulb electrode becomes negative, exceeds the breakdown potential, glows and becomes extinguished, and then the other electrode follows the same process. Since the time constant for conductive decay of the photoresistor typically is long compared to this pulse frequency, the photoresistor's resistance will rise only a limited amount between pulses. If the maximum value reached will still permit triggering and ringing, the fluctuations in resistance will not have a detrimental effect on the operation of the user's telephone. In practice, this has been found to be the case.

When not illuminated, photoresistor 63 both blocks triggering current and the flow of current to the telephone's ringer through the path consisting of the photoresistor, the gate junction and main terminal 1. The triac itself, in the absence of triggering, presents a resistance between terminals 1 and 2 typically in the megohm range, provided the breakdown voltage of the triac is not exceeded. Small signal triacs having breakdown voltages more than sufficient to prevent ringing are generally available and are used.

Figure 3:
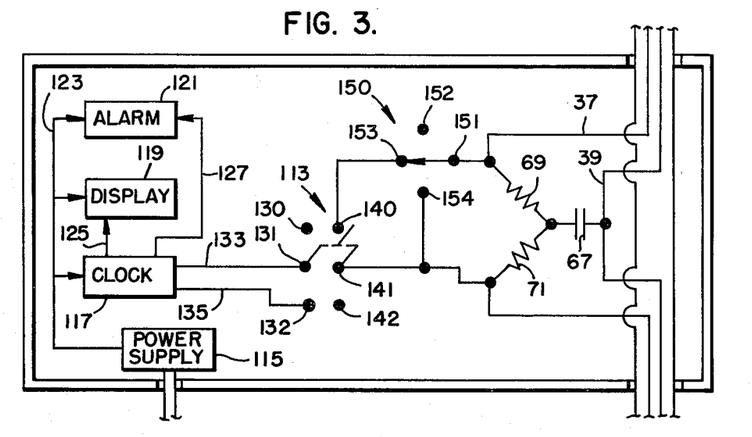
FIG. 3 shows an embodiment of the present invention wherein the telephone's ringer is silenced in conjunction with the setting and shutting off of an alarm clock. This figure also shows an override mechanism whereby the telephone's ringer can be either always on or always off irrespective of the operation of the alarm clock.
Figure 4:
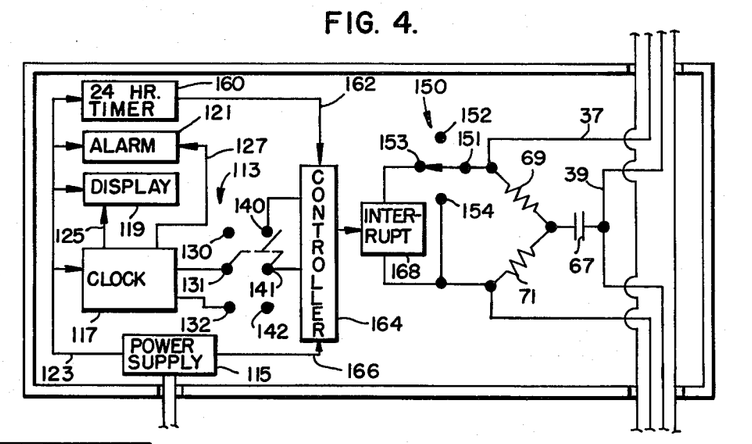
FIG. 4 shows an embodiment of the present invention wherein the telephone's ringer is silenced in conjunction with both the setting and shutting off of an alarm clock and the operation of a 24-hour timer.

Turning to FIGS. 3 and 4, these figures show embodiments of the present invention wherein the telephone's ringer is silenced in conjunction with the setting and shutting off of an alarm clock (FIG. 3) or in conjunction with both the setting and shutting off of an alarm clock and the operation of a 24-hour timer (FIG. 4).

The circuits of FIGS. 3 and 4 are used with the modular connectors and power cords shown in FIGS. 1 and 2. Accordingly, the discussion presented above regarding the operation, installation and characteristics of these components applies equally to the embodiments of FIGS. 3 and 4, except that plug 9, rather than being connected to the 24-hour timer, is normally connected directly to the power source, the 24-hour timer in FIG. 4 receiving its power through plug 9.

The various modifications to FIGS. 1 and 2, discussed above, such as eliminating some or all of cords 19, 21, 23 and 10 and incorporating connectors 13, 15 and 17 as well as plug 9 into the component enclosure, also apply to the FIGS. 3 and 4 embodiments. Further, as in FIGS. 1 and 2, the embodiments of FIGS. 3 and 4 maintain electrical isolation between the silencer's driving current and the telephone network. Also, these embodiments can include a substitute path for ringing current, such as the Y network of FIG. 1 or the single-sided shunt of FIG. 2. For purposes of illustration, FIGS. 3 and 4 are shown with the Y-shunt of FIG. 1 (capacitor 67 and resistors 69 and 71). If only one male modular connector is used, then the single-sided shunt of FIG. 2 (resistor 75 and capacitor 73) normally is used.

With particular regard to FIG. 3, this figure illustrates an embodiment of the present invention wherein a telephone's ringer is silenced in conjunction with the operation of an alarm clock. Although for various reasons people often desire to have their telephone ringer silenced during the daylight hours, the most common time when people do not want their telephone to ring is at night, when they are sleeping. The apparatus shown in FIG. 3 allows the user to automatically silence his telephone's ringer at the time he sets his alarm at night and to automatically reactivate the ringer in the morning when he shuts off the alarm.

As shown in FIG. 3, the alarm clock includes power supply 115, clock module 117, display module 119 and alarm 121. Power supply 115 is connected to a suitable source of electrical current by male plug 9 and cord 10, as shown in FIGS. 1 and 2. Power supply 115 is connected to clock module 117, display module 119 and alarm 121, as shown at 123, and provides the required driving current for these components. Clock module 117 is operatively connected to display module 119, as shown at 125, and to alarm 121, as shown at 127. The display module is used both to display the time of day and, in conjunction with the clock module, to establish the preselected time at which the alarm is to ring. At the preselected time, if the alarm is set, clock module 117 activates alarm 121.

Various known components can be used for power supply 115, clock module 117, display module 119 and alarm 121. For example, a MM5370 integrated circuit alarm clock chip, manufactured by the National Semiconductor Corporation, 2900 Semiconductor Drive, Santa Clara, Calif. 95051, can be used for clock module 117. This chip is designed for use with a high voltage gas discharge display, and accordingly, when used with this chip, display module 119 is of this type. Standard step-down transformer-rectifier-filter capacitor networks can be used for power supply 115. Alarm 121 can be a buzzer, a radio, a light or a similar device which can arouse a sleeping person.

The MM5370 chip includes a function whereby the alarm can be shut off and immediately set for the next day by momentarily connecting pin 3 of the chip to $V_{ss}$. Alternatively, the chip can be operated in the conventional manner wherein $V_{ss}$ is applied to pin 3 from the time the alarm is turned off until it is again set. In connection with the present invention, the conventional mode of operation should be used so that the user takes the action of setting his alarm clock at the time he goes to sleep and thus provides input to the telephone silencer at that time so that the silencer can operate to disable the telephone's ringer.

A discussion of the MM5370 chip, as well as other clock modules, displays, alarms and power supplies suitable for use with the present invention, can be found in the text *Electronic Clocks and Watches*, by Michael S. Robbins, Howard W. Sams & Co., Inc., Indianapolis, Ind. 46268, 1975, the pertinent portions of which are incorporated herein by reference. Similar discussions of components for alarm clocks suitable for use herein can be found in *Build-It Book of Digital Electronic Time-*

*pieces*, by Robert Haviland, Tab Books, Blue Ridge Summit, Pa. 17214, 1977, and "Digital Clock Circuits", *Modern Electronics Circuits Reference Manual*, by John Markus, McGraw Hill, New York, N.Y., 1980, pages 261–276, the pertinent portions of which are also incorporated herein by reference. It should be noted that although the operation of the alarm clock is discussed herein in terms of digital alarm clocks using solid state circuitry, the present invention is equally applicable to other types of alarm clocks, provided they have a user activated switch or other device for setting and shutting off the alarm.

Switch 113 in FIG. 3 serves three functions: first, by means of contacts 130–132, which are connected to clock module 117 by conductors 133 and 135, it sets and turns off alarm 121; second, by means of contacts 140–142, it interrupts conductive path 37 which carries ringing current to the telephone's ringer; and third, by insulating contacts 130–132 from contacts 140–142, it provides and maintains electrical isolation between the silencer's driving current and the telephone network. Contacts 130–132 have two states. In the first state, contact 131 is connected to contact 130 and alarm 121 is off; in the second state, contact 131 is connected to contact 132 and alarm 121 is set to ring at the time selected by the user. Similarly, contacts 140–142 have two states. In the open state, contact 141 is connected to contact 142, and conductive path 37 to the telephone's ringer is interrupted so that the ringer cannot receive sufficient current to ring and is silenced; in the closed state, contact 141 is connected to contact 140, and conductive path 37 to the telephone's ringer is not interrupted so that the ringer can receive sufficient ringing current to ring.

Switch 113 is constructed so that when the switch is operated to connect contact 131 to contact 132, it simultaneously connects contact 141 to contact 142. Conversely, when switch 113 is operated to connect contact 131 to contact 130, it simultaneously connects contact 141 to contact 140. Accordingly, when the user sets his alarm clock by operating switch 113 so that contacts 131 and 132 are connected, he simultaneously interrupts conductor 37 by disconnecting contact 141 from contact 140 and thus silences his telephone ringer by preventing sufficient current from reaching the ringer by means of conductor 37. On the other hand, when the user operates switch 113 to shut off his alarm and thus connects contact 131 to contact 130, he simultaneously connects contacts 141 and 140 whereby conductor 37 can carry sufficient current to the telephone ringer to cause the ringer to ring.

A typical sequence of operation is as follows. Prior to going to sleep, the user sets his alarm by operating switch 113 so that contact 131 is connected to contact 132. This will disconnect contact 140 from contact 141, and thus silence the user's telephone ringer. Subsequently, at the preselected time chosen by the user, alarm 121 is activated under the control of clock module 117. To shut off alarm 121, the user operates switch 113 so as to disconnect contact 131 from contact 132. This reconnects contacts 140 and 141, and thus the user's telephone will ring in response to incoming calls. In this way, the user's telephone is automatically silenced from the time he sets his alarm until the time he shuts the alarm off. Alternatively, if the user, for one reason or another, decides not to have his alarm ring at the preselected time and thus operates switch 113 to disconnect contact 131 from contact 132 prior to the time alarm 121 is activated by clock module 117, the telephone is silenced from the time the alarm is set until the time switch 113 is operated to cancel the alarm.

Although the operation of switch 113 has been described in terms of connecting conductors 133 and 135 to set the alarm, it is to be understood that depending on the particular alarm clock employed, setting of the alarm may involve breaking, rather than making, a conductive path, or some other change in state appropriate to the specific device used. For example, as discussed above, setting the alarm for a National Semiconductor MM5370 chip involves removing $V_{ss}$ from pin 3 of the chip. Accordingly, for this chip, switch 113 can be a single throw, double pole switch, rather than the double throw, double pole switch shown in FIG. 3. The important requirements for the practice of the present invention are that the operation of setting the alarm must be coordinated with interrupting the conductive path of the telephone's ringer, and the coordination must be done in such a way that the alarm clock's driving current is at all times electrically isolated from the telephone network.

In addition to switch 113, the apparatus shown in FIG. 3 includes override switch 150 having contacts 151 through 154. When contact 151 is connected to contact 152, conductor 37 is interrupted irrespective of the operation of switch 113. Accordingly, this position of switch 150 places the user's telephone ringer in a continuous OFF condition. When switch 150 is operated so that contact 151 is connected to contact 153, switch 113 determines whether or not conductor 37 is interrupted. This corresponds to the telephone's ringer being automatically silenced in conjunction with the operation of the alarm clock's setting mechanism. Finally, when switch 150 is operated so that contact 151 is connected to contact 154, conductor 37 can carry ringing current to the user's telephone irrespective of the operation of switch 113. Accordingly, this state for switch 150 corresponds to the telephone's ringer being in a continuous ON condition.

Turning now to FIG. 4, this figure shows an embodiment of the present invention wherein the telephone's ringer is placed under the control of both a 24-hour timer and the setting and shutting off of an alarm clock. Clock module 117, display module 119, alarm 121, power supply 115 and switches 113 and 150 operate in the same manner as in FIG. 3, except that contacts 140–142 of switch 113 do not directly interrupt conductor 37, but rather are used to input information to controller 164 regarding the state of the alarm clock's setting mechanism. Also, power supply 115 now supplies power to 24-hour timer 160 and controller 164, as shown at 123 and 166, in addition to supplying power to clock module 117, display module 119 and alarm 121.

It should be noted that switch 113 is shown in FIG. 4 as a double throw, double pole switch only for purposes of illustration and that simpler switches, appropriate to the specific electronics used, can be employed.

In addition to its alarm clock components, the circuit of FIG. 4 includes 24-hour timer 160, controller 164 and interrupt 168. 24-hour timer 160 operates in the same manner as the 24-hour timers used with the FIGS. 1 and 2 embodiments. That is, the timer includes means for setting one or more on-times and means for setting one or more off-times, and the timer changes states when the on-times and off-times are reached. Beginning with an on-time and ending with an off-time, the timer is in its first or ON state and produces a first input to controller 164 along line 162, which for purposes of describing the operation of controller 164 is hereinafter designated "1". Beginning with an off-time and ending with an on-time, the timer is in its second or OFF state and produces a second input to controller 164, which for purposes of describing the operation of controller 164 is hereinafter designated "0". Consistent with this notation, an input to controller 164 from contacts 140-142 of switch 113 corresponding to alarm 121 being set is designated "0", and an input corresponding to alarm 121 being off is designated "1". Also, the closed state of interrupt 168, wherein the telephone's ringer can receive sufficient ringing current to ring, is designated "1", and the open state, wherein the telephone's ringer cannot receive sufficient current to ring and is silenced, is designated "0".

Although commercial 24-hour timers can be used for 24-hour timer 160, low voltage solid state 24-hour timers, such as that used in the Micronta ® digital clock/timer, catalog number 63-886, sold by the Tandy Corporation of Fort Worth, Tex. 76102, are preferred so that timer 160 can be directly interfaced with the low voltage logic elements normally employed for controller 164. Also, separate components need not be used for 24-hour timer 160, clock 117 and controller 164, but rather a single chip embodying the functions of these components can be used.

Silencing of the user's telephone is under the control of controller 164 and interrupt 168. Interrupt 168 has two states: a closed state in which the ringer can receive sufficient ringing current to ring and an open state in which the telephone's ringer cannot receive sufficient current to ring and is silenced. Interrupt 168 also serves the important function of providing and maintaining electrical isolation between the silencer and the telephone network. Various devices can be used for interrupt 168, including mechanical and solid state relays, e.g., optoisolator type relays, which can be activated by the logic circuits used in controller 164 and which can withstand the ringing and voice currents carried on conductor 37.

Controller 164 combines the inputs from switch 113 and 24-hour timer 160 and determines the state of interrupt 168. Various control logics can be used for controller 164. For example, an AND gate, which sums the inputs from switch 113 and 24-hour timer 160, can be used. Using the nomenclature discussed above, the truth table for such an AND gate as applied to the present invention is as follows, where $Q_{24-HR}$, $Q_{113}$ and $Q_{INT}$ represent the states of 24-hour timer 160, switch 113 and interrupt 168, respectively:

| $Q_{24-HR}$ | $Q_{113}$ | $Q_{INT}$ |
|---|---|---|
| 0 | 0 | 0 |
| 0 | 1 | 0 |
| 1 | 0 | 0 |
| 1 | 1 | 1 |

In accordance with this logic, the user's telephone can ring only when both the 24-hour timer is in its ON state and the user's alarm clock is not set.

Figure 5:
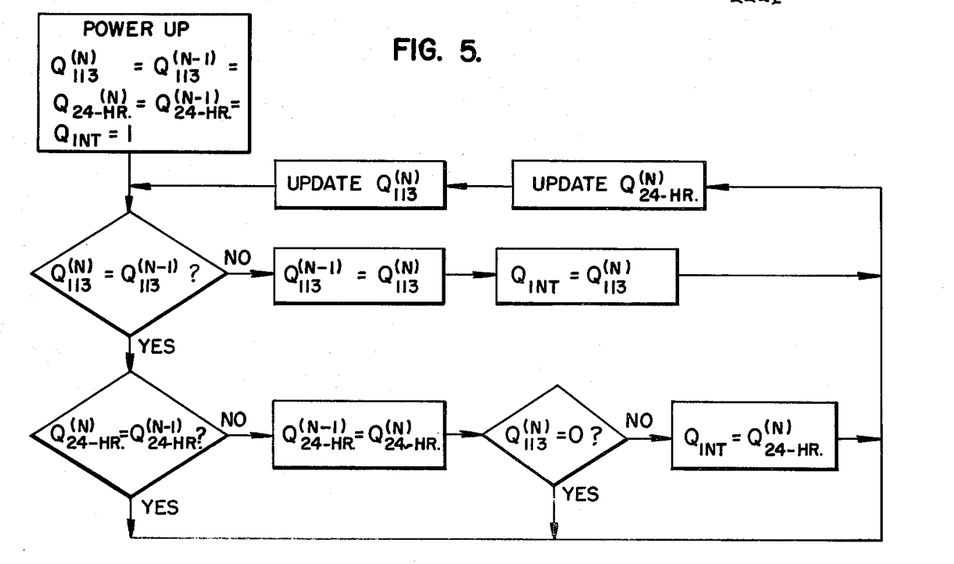
FIG. 5 shows a flow diagram for a controller for use in the circuit of FIG. 4 wherein the operation of the alarm clock takes precedence over the operation of the 24-hour timer in determining whether the telephone's ringer can or cannot receive sufficient ringing current to ring.

A preferred logic for use with controller 164 is shown in FIG. 5. In comparison with the AND logic, this logic has the advantage that the setting and shutting off of the user's alarm clock takes precedence over the operation of the 24-hour timer. An example of the circumstances under which this taking precedence is advantageous is as follows.

A typical user will probably only set his alarm clock on weekdays and will wish to sleep late and not be disturbed by the ringing of his telephone on weekends. To handle the weekend situation, the user will typically set the on-time and off-time of 24-hour timer 160 so that the ringer is silenced at, for example, 1:00 AM and is reactivated at, for example, 11:00 AM. During the week, the user may typically wish to be wakened by his alarm at 7:00 AM, and may typically operate switch 113 to set the alarm at 11:00 PM. With the AND logic, the user's telephone will remain silenced until 11:00 AM, because the 24-hour timer will be in its OFF state until 11:00 AM. The user in fact will be willing to receive telephone calls at any time after his alarm rings at 7:00 AM. The logic system of FIG. 5, as discussed below, solves this problem and causes the user's telephone to be reactivated at 7:00 AM, when the alarm clock is shut off, rather than at 11:00 AM when the 24-hour timer returns to its ON state.

The logic system of FIG. 5, which is conveniently implemented with a microprocessor, operates by searching for changes in the states of switch 113 and 24-hour timer 160. To do so, it stores both the current states of switch 113 and 24-hour timer 160 ($Q_{113}^{(N)}$ and $Q_{24-HR}^{(N)}$) and their previous states ($Q_{113}^{(N-1)}$ and $Q_{24-HR}^{(N-1)}$).

When the system is powered up, both the current and previous states of switch 113 and 24-hour timer 160, as well as the state of interrupt 168, are set equal to 1. Thus, at power up, interrupt 168 is in its closed state and sufficient current can reach the telephone's ringer so as to cause it to ring. Thereafter, the logic system of FIG. 5 continuously searches for changes in the states of switch 113 and 24-hour timer 160. In order that the state of switch 113 takes precedence over the state of 24-hour timer 160, changes in state of switch 113 are examined prior to changes in state of 24-hour timer 160.

If switch 113 is found to have changed its state, then both the values of $Q_{113}^{(N-1)}$ and of $Q_{INT}$ are set equal to $Q_{113}^{(N)}$. If 24-hour timer 160 is found to have changed its state, then $Q_{24-HR}^{(N-1)}$ is set equal to $Q_{24-HR}^{(N)}$ and a check is made to determine the state of switch 113. If switch 113 is in its 0 state, corresponding to the user's alarm clock being set, then no change is made in the state of interrupt 168 and the logic system returns to searching for further changes in the states of switch 113 or 24-hour timer 160. That is, the condition of the user having set his alarm takes precedence over changes in the state of 24-hour timer 160. If on the other hand, the state of switch 113 is 1, rather than 0, then changes in the state of 24-hour timer 160 are effectuated and $Q_{INT}$ is set equal to $Q_{24-HR}^{(N)}$. Thereafter, the logic system returns to searching for changes in the states of switch 113 or 24-hour timer 160.

In operation, the logic system of FIG. 5 allows the 24-hour timer to control the state of the telephone ringer when the user's alarm clock is not set, but has the state of the user's alarm clock take precedence over the state of the 24-hour timer when the alarm clock is set. In this way, on a weekend, the operation of the 24-hour timer will control because, presumably, the user's alarm clock has not been set and thus the state of switch 113 ($Q_{113}^{(N)}$) will be equal to 1.

The system also handles the weekday situation where the user's alarm clock is set to ring at a time earlier than the time when the 24-hour timer would normally reactivate the user's telephone ringer. This occurs as follows. The state of switch 113 will change from 0 to 1 at the time the user turns off his alarm clock. The logic system will respond to this change and set $Q_{INT}$ equal to 1, which will reactivate the user's telephone so that it will ring in response to incoming telephone calls. When the 24-hour timer eventually changes state, no change will actually occur in the state of interrupt 168 because the 24-hour timer will simply be repeating the earlier 0 to 1 change of switch 113.

It is understood that various modifications to the features of this invention can be made by those skilled in the art without departing from the invention's scope and spirit. For example, the silencer and the telephone can be combined as a single unit. In such a case, rather than interrupting the main conductive path from the telephone network to the telephone which carries both ringing and voice currents, only the conductive path actually leading to the ringer need be interrupted. With this arrangement, outgoing calls can still be made, even when the ringer is silenced. Further, rather than having a separate ringer and a separate alarm, the combined unit can use one sound generator. In such a case, a sensor can be used to detect ringing current and to activate the sound generator in response to such current in coodination with the state of the setting mechanism and, when used, the state of the 24-hour timer. For this arrangement, the conductive path for carrying ringing current to the ringer will include the sensor and the electronics of the sound generator, and the sensor will function as that portion of the interrupting means which provides electrical isolation between the silencer's source of electrical current and the telephone network. Also, rather than completely silencing the telephone, the silencer can be used to switch the ringer from a high to a low volume, or to change from ringing to some other type of indication of an incoming call, such as, the flashing of a light. Accordingly, it is not intended that the claims appended hereto be limited to the description set forth herein but rather that the scope of the claims be construed as encompassing all equivalents of the features of this invention.

I claim:

1. Apparatus for automatically silencing a telephone ringer in a modular jack telephone system comprising:
    an electrically operated alarm clock including means for connecting the alarm clock to a source of electrical current and means for setting the alarm clock, said setting means having a first state in which the alarm is off and a second SET state in which the alarm is set to operate at a preselected time;
    modular connecting means compatible with a modular jack telephone system;
    a conductive path electrically connected to said modular connecting means for carrying ringing current to a telephone ringer;
    means for interrupting said conductive path, electrically isolated from said source of electrical current, having a closed state in which said ringer can receive sufficient ringing current to ring and an open state in which said ringer cannot receive sufficient current to ring and is silenced; and
    means associated with said setting means and said interrupting means for transferring said interrupting means between said open and closed states while maintaining said interrupting means electrically isolated from said source of electrical current, said means for transferring being responsive to the state of said setting means so that when said setting means is in its first state, said interrupting means is in its closed state, and when said setting means is in its second SET state, said interrupting means is in its open state.

2. The apparatus of claim 1 further comprising means for overriding said means for interrupting having a first state in which the telephone ringer can receive sufficient ringing current to ring irrespective of the state of the interrupting means, a second state in which the telephone ringer cannot receive sufficient current to ring and is silenced irrespective of the state of the interrupting means and a third state in which the state of the interrupting means determines whether the telephone ringer can or cannot receive sufficient ringing current to ring.

3. The apparatus of claim 1 further comprising bridge means symmetrically arranged with respect to the interrupting means for providing an essentially identical substitute path for ringing current when the apparatus is in its open state for either end of the interrupting means connected to the telephone system.

4. The apparatus of claim 3 wherein the bridge means comprises a capacitor in series with two essentially equal parallel resistors, one of the resistors being connected to one end of the interrupting means and the other resistor being connected to the other end of the interrupting means.

5. Apparatus for automatically silencing a telephone ringer in a modular jack telephone system comprising:
    an electrically operated alarm clock including means for connecting the alarm clock to a source of electrical current and means for setting the alarm clock, said setting means having a first state in which the alarm is off and a second SET state in which the alarm is set to operate at a preselected time;
    an electrically operated 24-hour timer having an ON state and an OFF state and including means for connecting the timer to said source of electrical current;
    modular connecting means compatible with a modular jack telephone system;
    a conductive path electrically connected to said modular connecting means for carrying ringing current to a telephone ringer;
    means for interrupting said conductive path, electrically isolated from said source of electrical current, having a closed state in which said ringer can receive sufficient ringing current to ring and an open state in which said ringer cannot receive sufficient current to ring and is silenced; and
    means associated with said 24-hour timer, said setting means and said interrupting means for transferring said interrupting means between said open and closed states while maintaining said interrupting means electrically isolated from said source of electrical current, said interrupting means being in its open state when said setting means is in its second SET state and said means for transferring being responsive to the states of said setting means and said 24-hour timer to determine the state of said interrupting means.

6. The apparatus of claim 5 wherein the means for transferring causes the interrupting means to be in its closed state only if both the setting means is in its first state and the 24-hour timer is in its ON state.

7. The apparatus of claim 5 wherein the means for transferring responds to: (1) changes in the state of the setting means so that the interrupting means is in its open state when the setting means changes from its first state to its second state, and the interrupting means is in its closed state when the setting means changes from its second to its first state; and (2) changes in the state of the 24-hour timer, but only if the means for setting is in its first state, so that the interrupting means is in its open state when the 24-hour timer changes from its ON state to its OFF state and the interrupting means is in its closed state when the 24-hour timer changes from its OFF state to its ON state.

8. The apparatus of claim 5 further comprising means for overriding said means for interrupting having a first state in which the telephone ringer can receive sufficient ringing current to ring irrespective of the state of the interrupting means, a second state in which the telephone ringer cannot receive sufficient current to ring and is silenced irrespective of the state of the interrupting means and a third state in which the state of the interrupting means determines whether the telephone ringer can or cannot receive sufficient ringing current to ring.

9. The apparatus of claim 5 further comprising bridge means symmetrically arranged with respect to the interrupting means for providing an essentially identical substitute path for ringing current when the apparatus is in its open state for either end of the interrupting means connected to the telephone system.

10. The apparatus of claim 9 wherein the bridge means comprises a capacitor in series with two essentially equal parallel resistors, one of the resistors being connected to one end of the interrupting means and the other resistor being connected to the other end of the interrupting means.

11. Apparatus for automatically silencing a telephone ringer in a modular jack telephone system comprising:
an electrically operated alarm clock including means for connecting the alarm clock to a source of electrical current and means for setting the alarm clock, said setting means having a SET state in which the alarm is set to operate at a preselected time;
modular connecting means compatible with a modular jack telephone system;
a conductive path electrically connected to said modular connecting means for carrying ringing current to a telephone ringer;
means for interrupting said conductive path, electrically isolated from said source of electrical current, having a closed state in which said ringer can receive sufficient ringing current to ring and an open state in which said ringer cannot receive sufficient current to ring and is silenced; and
means associated with said setting means and said interrupting means for transferring said interrupting means to its open state when said setting means is in its SET state while maintaining said interrupting means electrically isolated from said source of electrical current.

12. The apparatus of claim 11 further comprising means for overriding said means for interrupting having a first state in which the telephone ringer can receive sufficient ringing current to ring irrespective of the state of the interrupting means, a second state in which the telephone ringer cannot receive sufficient current to ring and is silenced irrespective of the state of the interrupting means and a third state in which the state of the interrupting means determines whether the telephone ringer can or cannot receive sufficient ringing current to ring.

13. The apparatus of claim 11 further comprising bridge means symmetrically arranged with respect to the interrupting means for providing an essentially identical substitute path for ringing current when the apparatus is in its open state for either end of the interrupting means connected to the telephone system.

14. The apparatus of claim 13 wherein the bridge means comprises a capacitor in series with two essentially equal parallel resistors, one of the resistors being connected to one end of the interrupting means and the other resistor being connected to the other end of the interrupting means.

* * * * *